(12) United States Patent
Gens

(10) Patent No.: US 6,846,142 B2
(45) Date of Patent: Jan. 25, 2005

(54) SCREW FOR SCREWING INTO A MATERIAL OF LOW STRENGTH

(75) Inventor: Lothar Gens, Bad Berleburg (DE)

(73) Assignee: EJOT Verbindungstechnik GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 10/183,538

(22) Filed: Jun. 28, 2002

(65) Prior Publication Data

US 2003/0007845 A1 Jan. 9, 2003

(30) Foreign Application Priority Data

Jul. 5, 2001 (DE) .................................. 201 11 194 U

(51) Int. Cl.[7] .............................................. F16B 35/04
(52) U.S. Cl. ..................... 411/411; 411/426; 411/424
(58) Field of Search ............................. 411/426, 411, 411/424, 309, 310, 311, 326, 327, 328, 329

(56) References Cited

U.S. PATENT DOCUMENTS

| | | | | | |
|---|---|---|---|---|---|
| 1,031,639 | A | * | 7/1912 | Funderburg | ................. 411/321 |
| 2,301,181 | A | * | 11/1942 | Ilsemann | ................. 411/309 |
| 3,882,917 | A | * | 5/1975 | Orlomoski | ................. 411/309 |
| 4,024,899 | A | * | 5/1977 | Stewart | ................. 411/277 |
| 4,252,168 | A | * | 2/1981 | Capuano | ................. 411/311 |
| 4,892,429 | A | * | 1/1990 | Giannuzzi | ................. 411/383 |
| 5,267,423 | A | * | 12/1993 | Giannuzzi | ................. 52/410 |
| 6,419,436 | B1 | * | 7/2002 | Gaudron | ................. 411/426 |

* cited by examiner

Primary Examiner—Heather Shackelford
Assistant Examiner—Lisa M. Saldano
(74) Attorney, Agent, or Firm—Banner & Witcoff, Ltd.

(57) ABSTRACT

Screw made of plastic for screwing into a material of low strength, e.g. rigid foam plastic, having a deep thread compared with the screw shank, the screw shank running out conically into a screw point. The screw has the following features:

1. the depth of thread H and the minor diameter Dk of the thread form a quotient $Q1=H/Dk$ in the order of magnitude of 1 to 3.5, preferably 2;
2. the minor diameter Dk and the thread pitch P form a quotient $Q2=Dk/P$ in the order of magnitude of 0.3 to 0.6, preferably 0.5;
3. the thread is designed as a V-thread having a vertex angle of the thread teeth of less than 30°.

7 Claims, 2 Drawing Sheets

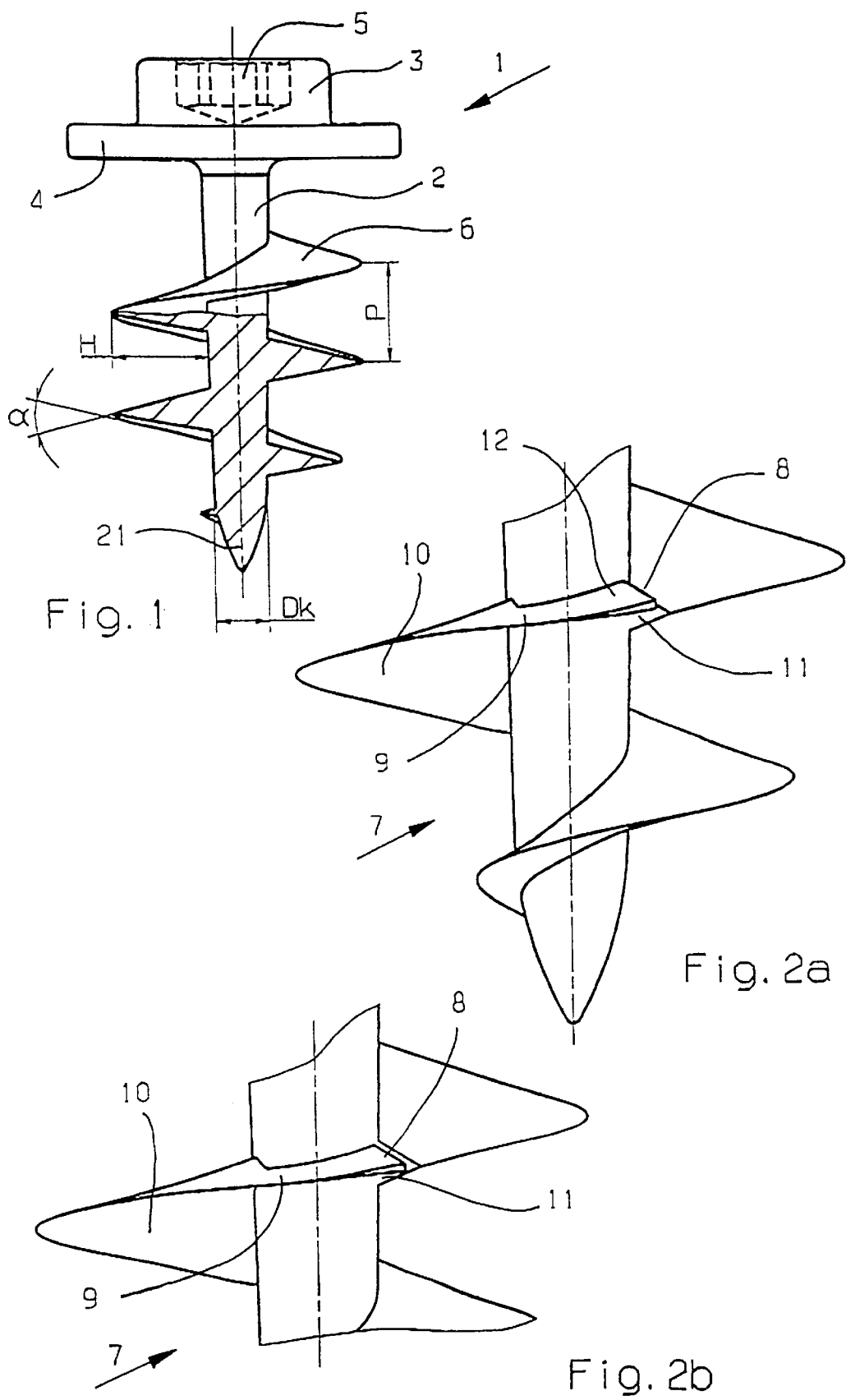

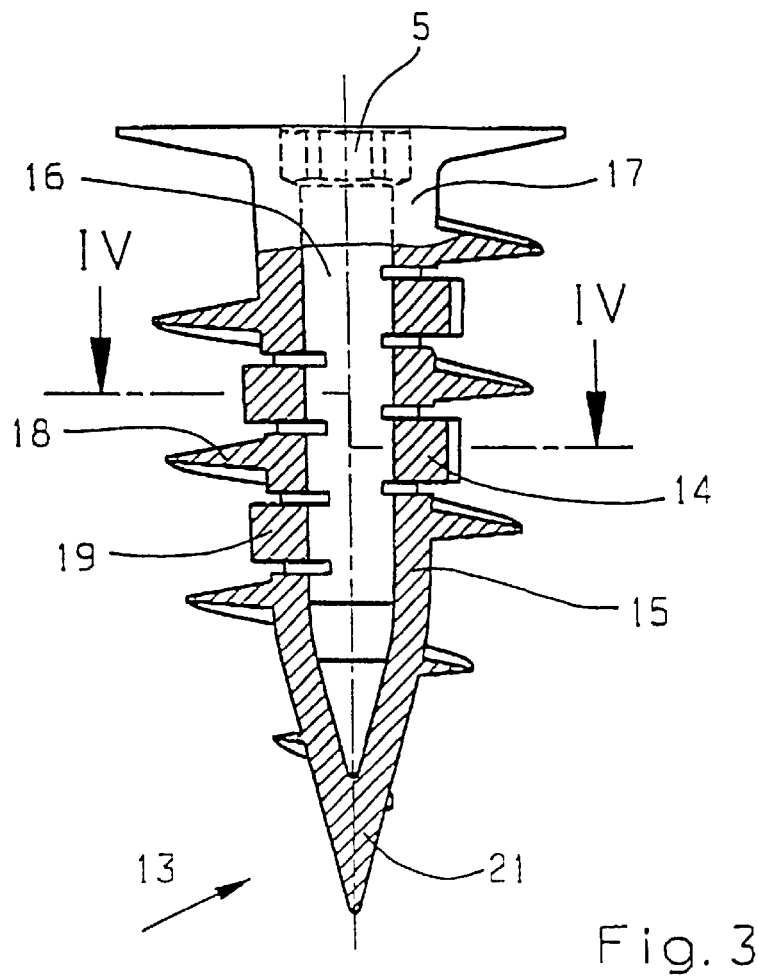
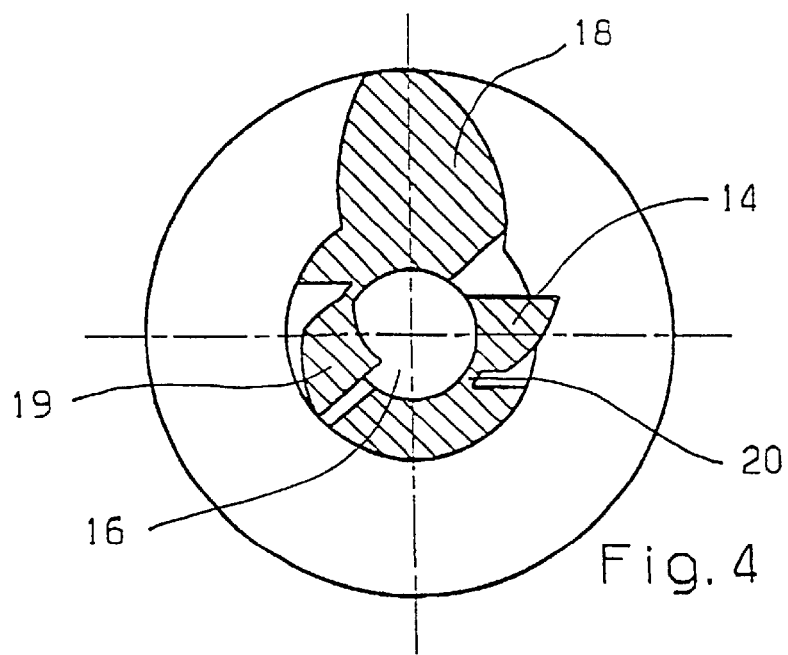

SCREW FOR SCREWING INTO A MATERIAL OF LOW STRENGTH

FIELD OF THE INVENTION

The invention relates to a screw for screwing into a material of low strength, e.g. rigid foam plastic, having a deep V-thread compared with the screw shank, the screw shank running out conically into a screw point.

BACKGROUND OF THE INVENTION

Such a screw has been disclosed by German Utility Model 29812947. This screw is a screw-in plug, although this is a factor which does not change anything with regard to the dimensioning ratios concerning the thread of the screw compared with corresponding simple screws. The known screw is likewise provided in particular for screwing into rigid foam plastic and for this purpose has certain dimensioning of the thread turns with respect to the screw shank. An effect which is desired in this screw consists in engaging behind a large amount of the relevant construction material in order to achieve high retaining forces. For this purpose, the thread is designed as an acme thread in which the thread turns are flattened cylindrically on the outside, so that the thread turns in this case run out in the form of a flat which increases in width in the direction of the screw head. A depth of thread of approximately ¾ of the shank diameter and a thread pitch which approximately corresponds to the shank diameter are specified as especially favorable dimensioning. Values of between 5° and 20° are specified for the thread angle.

SUMMARY OF THE INVENTION

The object of the invention is to specify a screw whose screw-in torque and retaining force are substantially increased compared with the known screws. According to the invention, this is done by the combination of the following features:

1. the depth of thread H and the minor diameter Dk of the thread form a quotient $Q1=H/Dk$ in the order of magnitude of 1 to 3.5, preferably 2;
2. the minor diameter Dk and the thread pitch P form a quotient $Q2=Dk/P$ in the order of magnitude of 0.3 to 0.6, preferably 0.5;
3. the thread is designed as a V-thread having a vertex angle of the thread teeth of less than 30°.

With a large depth of thread H and a small minor diameter Dk, the depth to which the thread flanks can engage in the material can be inferred. The deeper the engagement, the greater is the resistance which the material can put up against tearing forces. Accordingly, the quotient $Q1=H/Dk$ of preferably 2 is a relatively high value, since it means that the depth of thread H is twice as large as the minor diameter Dk. In the known screw, only about ¾ of the shank diameter (minor diameter) Dk is achieved for this dimensioning of the depth of thread H.

The quotient $Q2=$minor diameter Dk/thread pitch P states how the pitch P behaves in relation to the minor diameter Dk. In this case, a large pitch is favorable because it leaves relatively large regions of the material between the thread turns when the screw is being screwed in, whereby these regions remain undisturbed, which is of particular importance for the relatively soft materials in question here, in particular rigid foam plastic. These materials have no especially pronounced intrinsic support and therefore tend to quickly crumble when threads with thread turns closely following one another are being screwed in, whereby the retaining forces of the material are virtually destroyed. In the case of the screw according to the invention, the quotient $Q2=Dk/P$ is 0.3 to 6, preferably 0.5, i.e. the pitch P in the most favorable case is twice as large as the minor diameter. In the known screw, a substantially smaller pitch is obtained because the pitch of the thread in this screw corresponds approximately to the shank diameter.

With regard to the configuration of the thread teeth, it is important in the screw according to the invention to configure these thread teeth at an acute angle, which, compared with an acme thread, substantially facilitates the cutting-edge-like penetration of the thread teeth when the screw is being screwed into the material. With the acme thread, the material must be pushed aside in a planar manner with the outer flat of the thread turns, whereas, on the other hand, the cutting-edge-like V-thread used in the screw according to the invention can penetrate into the material relatively easily on account of the cutting effect. With regard to the vertex angles of the thread teeth, approximately the same ratios are present in the screw according to the invention and the known screw, which is attributed to the fact that in principle relatively small vertex angles are used in the screws in question here.

The result of this is that the screw according to the invention, with its dimensioning specified above, is substantially superior to the known screw and thus also to other screws with regard to screw-in torque and retaining forces.

Since the screw according to the invention serves for screwing into a material of low strength, there is always a certain risk with this screw that it easily loosens in the material, e.g. due to shaking movements, since the material, on account of its property, can only exert relatively small friction forces on the thread turns of the screw. In order to make slacking-back of the screw more difficult, locking teeth have already been provided according to DE 19816085 A1 in a screw with a cylindrical screw shank and V-thread for screwing into a material of low strength, these locking teeth projecting on the thread root between the thread turns as fixed components of the material of the screw.

When this screw is being screwed in, the locking teeth make corresponding grooves in the material, and the screw is screwed in place in these grooves, since the locking teeth, as stated, project from the thread root of the screw. On account of certain elasticity of the material, however, this material may withdraw slightly against the displacement direction into its original form when the screw is being screwed in, yet a certain deformation of the material in the region in which the locking teeth are screwed in cannot be avoided, so that the locking effect of these locking teeth is only slight.

According to the invention, the problem of especially good locking of the screw against slackening-back is achieved in a screw having locking elements arranged in the thread region in that the locking elements are held in a pivotable manner by film hinges which project from the screw material in the relieved position, swing into a recess in the screw material when the screw is being screwed in and spring out of this recess when the screw is being slackened back.

When the screw is being screwed in, the locking elements are pressed by the material into the recess in the screw material, so that they leave virtually no grooves behind in the material when the screw is being screwed in. After the screw has finally been screwed in, the locking elements then attempt to spring out of the axial bore, for which they are given the requisite tension by the film hinges. If a restoring torque then acts on the screw, a pressure is applied to the locking surfaces of the locking elements, and in this way this pressure assists the locking elements when they are springing out and drives them properly into the material, which makes it possible to prevent slackening-back in an especially reliable manner.

The space in the screw material into which the locking elements can be pressed can be let into the thread root or the thread turns. The expedient position is obtained on the basis of the respective production conditions.

BRIEF DESCRIPTION OF THE DRAWINGS

Exemplary embodiments of the invention are shown in the figures.

In the drawing:

FIG. 1 shows the screw with its special form of the thread without locking elements, FIGS. 2a and 2b show the same screw with locking elements which are let into the thread turns, FIGS. 3 and 4 show sectional views of the screw with locking elements let into the thread root.

DETAILED DESCRIPTION OF THE PREFERRED EMBODIMENT

The screw 1 shown in FIG. 1 is made of plastic, e.g. a glass-fiber-reinforced polypropylene, and it has the screw shank 2 with the screw point 21 and the screw head 3 with a collar 4 adjoining the screw head. The receptacle 5 for a hexagon key is provided in the screw head 3. The screw shank 2 has the thread 6, which, as can be seen, consists of acute-angled thread turns which have a relatively small thread angle α, 25° in the exemplary embodiment selected. The screw 1 shown also has the following dimensions: the quotient Q1 of depth of thread H and minor diameter Dk is 1.75; the quotient Q2 of minor diameter Dk and thread pitch P is 0.55.

The screw 1 in FIG. 1 can be screwed in an especially easy manner into a material of low strength, in particular rigid foam plastic, with self-cutting of the groove of the nut thread in the material, and also develops high retaining forces in the latter on account of the relatively large surfaces of the thread turns.

With regard to the basic configuration of the thread, the screw 7 shown in FIGS. 2a and b corresponds to the screw 1 according to FIG. 1. The screw 7 is provided with a locking element 8 which is held on the thread turn 10 in a pivotable manner by the film hinge 9. In its relieved position shown in FIG. 2a, the locking element 8 projects from the material of the thread turn 10, but can be pivoted into the recess 11 in the material of the thread turn 10 when the screw 7 is screwed in, so that the surface 12 of the locking element 8 follows virtually an uninterrupted flank of the thread turn 10 and consequently does not form an obstruction for the screwing of the screw into a plastic material. This impressed position is shown in FIG. 2b. After the screw 7 has been screwed into a material of low strength, the effect which is obtained when the screw 7 is slackened back is that, under the spring force of the film hinge 9, the locking element 8 is forced out of its swung-in position shown in FIG. 2b and is braced against the material of the workpiece, a factor which gives the locking element 8 the tendency to move back completely into the position shown in FIG. 2a, in which it can then fully develop its locking effect against slackening-back of the screw.

A locking element 8 may also be arranged in a plurality of thread turns.

In the screw 13 shown in FIGS. 3 and 4, locking elements are likewise provided, to be precise the locking elements 14 and 19, which in this case are let into the thread root 15. In order to give the locking elements 14 and 19 the necessary recess for pivoting into the screw material, the screw 13 is provided with a longitudinal bore 16, so that the screw 13 is of tubular design in the region of the screw shank 17.

FIG. 3 shows the screw 13 in longitudinal section, to be precise with the locking elements 14 and 19 in their relieved position. From this position, as can be seen, the locking elements 14 and 19 can be pressed into the longitudinal bore 16 when the screw 13 is screwed into a workpiece.

FIG. 4 shows a cross section through the screw 13 along line IV—IV in FIG. 3. This section is taken through the thread turn 18 which cannot be seen in FIG. 3, since it projects away from the drawing plane. The section according to FIG. 4 runs through both locking elements 14 and 19, in which case, in order to illustrate the functioning, the locking element 14 is depicted in the relieved position and the locking element 19 is depicted in the swung-in position. The relieved position of the locking element 14 and the swung-in position of the locking element 19 can therefore be clearly seen in comparison from FIG. 4. In its swung-in position, the locking element 19 is pressed into the longitudinal bore 16. The locking elements 14 and 19 are held by the film hinges 20, which permit the corresponding movement of the locking elements 14 and 19 and in the process cause the locking elements to spring out into the relieved position (see locking element 14).

With regard to the functioning of the locking elements 14 and 19, reference is made to the explanations of the locking element 8 in connection with FIGS. 2a and 2b.

The term "film hinge" designates a weakening in the region of the transition of the locking element into the material of the screw, this weakening enabling the locking pawl to swing in and spring out in the way described above.

What is claimed is:

1. Screw (1) made of plastic for screwing into a material of low strength having a screw shank (2) defining a minor diameter and a thread (6) having a certain pitch (P) and a large depth (H) as compared with the screw shank (2), the screw shank running out conically into a screw point (21), characterized by the screw having a main portion wherein any part of the main portion has the combination of the following features:
   1. the depth of thread (H) and the minor diameter (Dk) of the thread form a quotient Q1=H/Dk in the order of magnitude of 1 to 3.5;
   2. the minor diameter (Dk) and the thread pitch (P) form a quotient Q2=Dk/P in the order of magnitude of 0.3 to 0.6;
   3. the thread (6) is designed as a V-thread having a vertex angle of the thread teeth of less than 30°.

2. Screw (7, 13) made of plastic for screwing into a material of low strength having locking elements (8, 14, 19)

which are arranged in a thread region and make slackening-back of the screw (7, 13) more difficult, according to claim 1, characterized in that the locking elements (8, 14, 19) are held in a pivotable manner by film hinges (9, 20) which project from the screw material in the relieved position, swing into a recess (11, 16) in the screw material when the screw (7, 13) is being screwed in and spring out of this recess (11, 16) when the screw is being slackened back.

3. Screw according to claim 2, characterized in that the locking elements (8) are let into thread turns (10).

4. Screw according to claim 2, characterized in that the locking elements (14, 19) are let into a thread root (15).

5. Screw according to claim 1, characterized in that the quotient $Q1=H/Dk$ is in the order of magnitude of 1.5 to 3.5.

6. Screw according to claim 1, characterized in that the quotient $Q1=H/Dk$ is in the order of magnitude of 2 to 3.5.

7. Screw according to claim 1, characterized in that the quotient $Q2=Dk/P$ is in the order of magnitude of 0.5 to 0.6.

* * * * *